Patented Jan. 6, 1942

2,268,602

UNITED STATES PATENT OFFICE 2,268,602

PROCESS FOR PREPARING SEED MATERIAL FOR THE IMPROVEMENT OF BITUMINOUS SUBSTANCES OF LOW QUALITIES

Richard Lichtenstern, Vienna, Germany

No Drawing. Application May 31, 1938,
Serial No. 211,024

11 Claims. (Cl. 106—273)

The present invention relates to the preparation of concentrated polymerisation products for the manufacture of elastic asphalt masses. This process as hereinafter described is an improvement of a prior invention described and claimed in my U. S. Patent No. 1,720,487 of July 9, 1929.

In the said patent I have shown, that it is possible to obtain infusible asphalt masses of high elasticity by heating asphalt together with Chinese wood oil; the polymerisation thus occurring yields the desired product of high elasticity. The operation is enhanced by the use of known catalysts, particularly those of the group of metal chlorides.

In carrying out the above mentioned patented process I have made use of the catalysts such as iron chloride, aluminium chloride or zinc chloride in an amount of up to 10 per cent. calculated on the mixture of asphalt and Chinese wood oil and the heating of the entire mass was carried out at about 300° C.

I have now discovered that it is not necessary to subject the whole mass of the raw materials which are used for manufacturing the final product to the heat treatment at so high temperatures as 300° C. Moreover, I have found, that the quantities of catalysts, which in the process hitherto employed were rather considerable, may be reduced to a remarkable degree when proceeding according to the process of my present invention.

I have made the discovery, that in the polymerisation and condensation processes occurring, highly reactive "seeds" are formed from the original molecules. By the expression "seed" I want to indicate a sort of basic molecule which is capable of forming long chain-shaped macro molecules, these forming during the polymerisation and being the desired stable end product of high elasticity.

In carrying the invention into practice I make use of this discovery by first preparing small quantities of prepolymerised substances (seed material) which may afterwards serve for effecting the polymerisation of the material to be treated at a much lower temperature and with relatively small amounts of catalysts. These pre-polymerised seeds are to be considered as a kind of "inoculating" agent.

The above mentioned reduction in temperature as well as in the amount of catalysts are considerable advantages from the practical point of view. Thus the reaction temperature may in most cases be chosen as low as 160–180° C. and this renders it possible, to subject to the present process also such products, which at higher temperatures would partially be evaporated and thus cause losses of valuable substances or on the other hand would undergo such changes in the qualities of certain components that the end product would be of poorer quality than desirable. I may for instance mention the tars obtained from coal or browncoal and so on, which tars are after evaporation of the lighter and medium factions often used for road surfacing and similar purposes; such tars frequently contain oily components, which are volatile at temperatures of about 180° C. or will decompose when heated to such a degree. Such tars can according to my invention with the aid of the inoculating masses be transformed into more valuable highly viscous tar products or elastic asphalt products without being deprived of the useful oily components.

In Examples 1, 2 and 3, I will describe details for the preparation of "seed mass," and in Example 4, I will describe the use of such "seed mass" with larger amounts of the bituminous material to be improved. As already mentioned above first of all a mass has to be prepared, which will serve as seed for the further polymerisation processes or for inoculating the masses to be polymerised. I may for instance proceed as follows:

*Example 1.*—20 parts of solid zinc chloride ($ZnCl_2$) are dissolved in about the same amount (20 parts) of water and heated to boiling temperature. Instead of dissolving solid zinc chloride I may use the much less expensive so-called crude zinc chloride solution, which has a specific gravity of about 50 to 60° Baumé and contains approximately 50 per cent. of zinc chloride. In this case instead of 20 parts of solid zinc chloride 40 parts of the solution, which boils at about 110° C. are used.

Into the boiling solution there are gradually introduced with occasional stirring 80 parts of a soft petroleum asphalt having a melting point of about 38–45° C. (ring and ball) or of some other bituminous substance such as tars of different origin for instance coal tar or brown coal tar and so on. The tars or like substances are introduced into the zinc chloride liquor in a molten condition, care being taken, that the mass does not boil over and pass out of the reaction vessel. The temperature is meanwhile rising and the water evaporating pretty rapidly. After the whole mass of the butumen has been introduced the liquid mass is at about 160° C. and is still foaming a little. Heating is then continued up to about 180–200° C. in order to remove the last portions of water until only imperceptible traces of the water are left, after which the mass is allowed to cool with occasional stirring. The cool mass is poured into suitable vessels (sheet-metal drums, or the like) or into moulds and after having been completely cooled and solidified is stored till it is used.

*Example 2.*—An inoculating mass may also be prepared with the use of less zinc chloride. I may use for instance 5 parts of solid zinc chloride or 10 parts of zinc chloride solution and 95 parts of asphalt or another bituminous mass. This will have about the same properties as the inoculating mass first described, with the exception that in some cases it will be necessary to use a greater quantity thereof in order to obtain the same effect as with the more concentrated mass produced as in Example 1. On the other hand the preparation of the mass mentioned in this example is simpler, since a smaller quantity of water has to be removed and this can therefore be done in a shorter time.

Different tars may be used for the preparation of the inoculating mass as already mentioned before. When suitable tars or other substances are used the inoculating masses may also be obtained in a liquid state for instance in the following manner:

*Example 3.*—50 to 20 parts of solid zinc chloride or the double quantity of zinc chloride solution are heated as above described to boiling temperature and to the boiling solution, for instance wood tar is gradually added in such an amount as to yield 100 parts of the final product (after removal of water). The mass is treated as in Example 1. The final product is of liquid or viscous consistency and is filled into appropriate receivers. In such inoculating masses which remain liquid there may form a precipitate at the bottom, which must be stirred up before use.

*Example 4.*—The inoculating mass ("seed mass") may be used in the following manner:

As may be required 0.50 to 15 per cent. of the mass are used for the preparation of the polymerised masses, by fusing the crude materials, introducing the seed mass (product of any of the above example) into the molten mass and heating the same to 160–180° C. (if required up to about 200° C.). The mixture is then allowed to react for about 15 to 30 minutes at the highest temperature applicable in the process, which has been previously determined, stirring now and then, until the desired reaction has taken place, which may be seen by taking small samples. If it is for instance desired to prepare a highly elastic mass from asphalt and Chinese wood oil as set forth in U. S. Patent 1,720,487, I take, as indicated in Example 4 of said patent 70 parts of petroleum asphalt, melt the same and add thereto 5 parts of the inoculating mass made from petroleum asphalt according to Example 1 of the present application. I then heat the mass to 160°, add thereto 30 parts of Chinese wood oil, which has been preheated to 140–160°, mix the whole mass thoroughly and heat it to 180° C. At this temperature the whole will soon coagulate to a highly elastic mass. This operation is of course much simpler than the one described in the above patent and requires only a small fraction of the catalyst there mentioned.

It is remarkable that soon after the addition of the seed mass to the asphalt and with mild heating the asphalt becomes very tough and elastic. The process may therefore also be used for increasing the melting point of bituminous substances and at the same time for increasing their toughness, and also for preparing bitumina being per se elastic. In making use of this discovery I have for instance treated tars as follows:

100 parts of coal tar having a viscosity of 33" at 30° C. (street tar I according to the British standard specifications) are heated to 140° C. and thereafter 0.50 part of the seed mass (made from petroleum asphalt in accordance with Example 1 of this application) are added. The mixture is then heated for half an hour to 160–170° C. with occasional stirring. The resulting tar has a viscosity of 73" at 30° C., (which is a high viscosity) and the adhesive power of the tar is also a very considerable one. It may be used very advantageously, in road construction instead of asphalt.

These highly viscous and elastic tars may also be mixed with lighter distillates of the tar and mineral oil distillation and so-called "cold tars" may thus be obtained, which are used in road construction in the cold and also for other purposes. In the same way other soft petroleum asphalts, being of little value, or other bitumina may be improved. For preparing the seed mass I may also use waste resins from the refining of tar or petroleum distillates, particularly the so-called cumarone resins.

What I claim is:

1. A process which comprises preparing a seed material for the improvement of bituminous substances of poor quality which comprises heating a bituminous substance together with a catalyst selected from the group consisting of zinc chloride, aluminium chloride and iron chloride at temperatures between about 160° C. and about 200° C., and for a time which will allow polymerisation to take place, and thereafter adding the seed material so produced to a larger bulk of bituminous substance to be improved.

2. A process according to claim 1, in which the catalyst is a zinc chloride solution of about 50% strength.

3. A process according to claim 1, in which the amount of catalyst for preparing the seed material is between 0.5 and 15 per cent. of the bituminous substance and the temperature at which polymerisation takes place is 160–180° C.

4. A process according to claim 1, in which the seed material is made from tar.

5. A process according to claim 1, in which the seed material is made from petroleum asphalt.

6. A process according to claim 1, in which the seed material is made from waste resins of the mineral oil raffination.

7. A process according to claim 1 in which the seed material after polymerisation has taken place is cooled and stored up for a later use.

8. A process according to claim 1 in which the seed material is made from the same kind of bitumen which is to be improved by its inoculation.

9. A process for improving bituminous substances of low qualities which comprises preparing a seed material by preliminary polymerisation of a minor portion only of said bituminous substance with addition of a metal chloride, and heating to between about 160° C. and about 200° C., adding said seed material to the bulk of the bituminous substance to be improved and heating the entire mass to polymersiation temperature and duration.

10. A process according to claim 9 in which the bituminous substance to be improved is a tar.

11. A process according to claim 9 in which the bituminous substance to be improved is a petroleum asphalt.

RICHARD LICHTENSTERN.